United States Patent Office 2,838,491
Patented June 10, 1958

2,838,491
6-FLUORO STEROIDS

Milton E. Herr, Kalamazoo, John C. Babcock, Portage Township, Kalamazoo County, and J Allan Campbell, John A. Hogg, and Raymond L. Pederson, Kalamazoo, Mich., assignors to The Upjohn Company, Kalamazoo, Mich., a corporation of Michigan No Drawing. Application February 19, 1958
Serial No. 716,016

13 Claims. (Cl. 260—239.5)

The present invention relates to new 6α- and 6β-fluorinated steroids and is more particularly concerned with 6-fluoro-11-oxygenated-17β-hydroxy - 17α - lower alkenyl hydrocarbon - 4 - androsten-3-ones and the 17-acylates thereof, for example, 6-fluoro-11β,17β-dihydroxy-17α-(α-methallyl) - 4 - androsten-3-ones [6-fluoro-11β-hydroxy-17α - (α-methallyl)testosterones], 6-fluoro-11β,17β-dihydroxy - 17α-(α-methallyl)-19-nor-4-androsten-3-ones [6-fluoro - 11β - hydroxy - 17α - (α - methallyl) - 19 - nor - testosterones], 6-fluoro-17β-hydroxy-17α-(α-methallyl)-4-androstene-3,11-diones [6-fluoro-11-keto-17α-(α-methallyl)testosterones], 6 - fluoro-17β-hydroxy-17α-(α-methallyl)-19-nor-4-androstene-3,11-diones [6-fluoro-11-keto-17α-(α-methallyl)-19-nortestosterones], the 17-acylates thereof and novel steroid intermediates and methods used in the preparation thereof.

The novel end product compounds of this invention are represented by the formula:

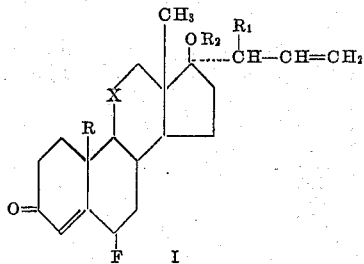

wherein R is methyl or hydrogen, $R_1$ is hydrogen or a lower alkyl radical, $R_2$ is hydrogen or an acyl radical of an organic carboxylic acid, preferably a hydrocarbon carboxylic acid, containing from one to twelve carbon atoms, inclusive, and X represents a carbonyl radical (>C=O) or a hydroxymethylene radical (>CHOH). The term "lower alkyl radical," as used herein, refers to an alkyl radical of from one to three carbon atoms, inclusive, e. g., methyl, ethyl, propyl, and isopropyl.

It is an object of the instant invention to provide novel 6 - fluoro-11-oxygenated-17β-hydroxy-17α-lower alkenyl hydrocarbon-4-androsten-3-ones and the 17-acylates thereof, for example, 6-fluoro-11β-hydroxy-17α-(α-methallyl)testosterones, 6-fluoro-11β-hydroxy-17α-(α-methallyl) - 19-nortestosterones, 6-fluoro-11-keto-17α-(α-methallyl)testosterones, 6 - fluoro-11-keto-17α-(α-methallyl)-19-nortestosterones and the 17-acylates thereof and novel intermediates and methods in the production thereof. Other objects of this invention will be apparent to those skilled in the art to which this invention pertains.

The novel end products of this invention, the compounds of Formula I possess useful therapeutic properties as orally and parenterally active progestational agents. They affect the secretion of gonadotropins and thus regulate ovulation and endometrial and placental development and, particularly when used in conjunction with estrogens, e. g., ethinylestradiol and/or androgens, e. g., "Halotestin" (9α - fluoro-11β-hydroxy-17-methyltestosterone), reduce fertility and constitute effective therapy for dysmenorrhea, amenorrhea, endometriosis, threatened abortion and related gynocological disorders. Administration of these steroids can be in conventional dosage forms such as pills, tablets, capsules, syrups or elixirs for oral use, or in liquid forms which are adaptable to the natural and synthetic steroid hormones for injectable products. Microcrystalline aqueous suspensions or oil solutions can be prepared for parenteral dosage.

The novel steroids of Formulae Ia, Ib, Ic, and Id, can be prepared according to the following reaction sequence:

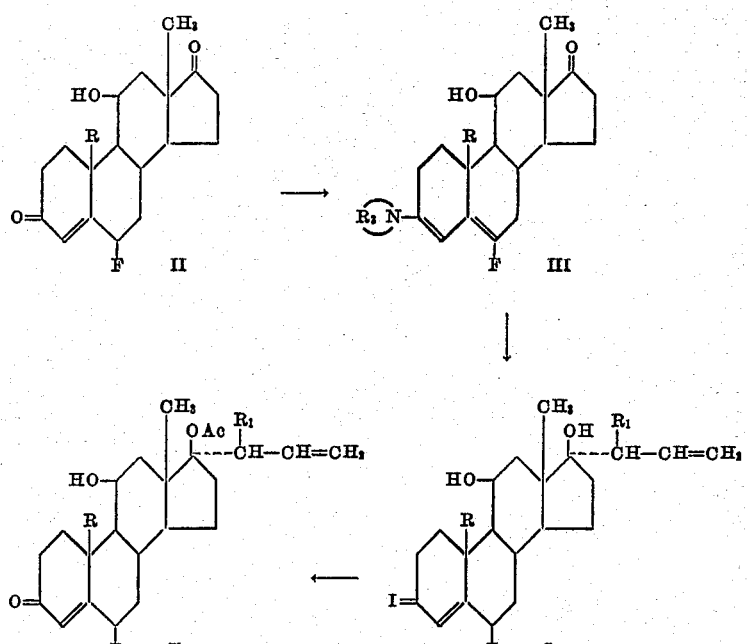

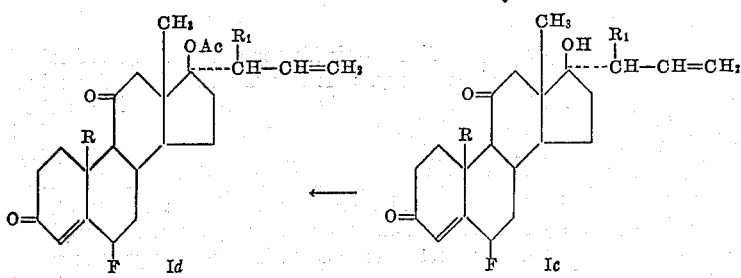

wherein R and $R_1$ have the same meaning as previously given, Ac is the acyl radical of an organic carboxylic acid, preferably a hydrocarbon carboxylic acid, containing from one to twelve carbon atoms, inclusive, and $R_3$ is an alkylene group which, together with the nitrogen atom, forms a ring containing from five to six members, inclusive, and which preferably contains less than nine carbon atoms.

One aspect of the process of the present invention comprises treating compounds of the type represented by Formula II, for example, 6-fluoro-11β-hydroxy-4-androstene-3,17-diones and 6-fluoro-11β-hydroxy-19-nor-4-androstene-3,17-diones with a secondary amine such as pyrrolidine, to obtain the compounds of Formula III, for example, 6-fluoro-11β-hydroxy-3-(N-pyrrolidinyl)-3,5-androstadien-17-one and 6-fluoro-11β-hydroxy-3-(N-pyrrolidinyl)-19-nor-3,5-androstadien-17-one. Other secondary amines and particularly secondary cyclic alkylene amines, such as piperidine, C-alkyl substituted piperidines, e. g., 2,4-dimethylpyrrolidine, 3-isopropylpyrrolidine, 3,3-dimethylpyrrolidine, and the like, are suitable to convert the compounds of Formula II into the corresponding 3-enamine compounds of Formula III.

The thus-obtained compounds of Formula III are then treated with a Grignard reagent, for example, 2-butenylmagnesium bromide (or chloride) to add the side chain at the 17α-position. The Grignard reagent is then decomposed using procedures well-known in the art. Preferably, aqueous ammonium chloride or water is used to decompose the Grignard reagent. Following the Grignard reagent decomposition, the 3-enamine group is removed by hydrolysis. The hydrolysis of the 3-enamine group is preferably carried out using a buffered solution, such as a solution containing sodium acetate, water, glacial acetic and methanol. Alternatively, the 3-enamine group is hydrolyzed using mildly alkaline conditions, such as a sodium acetate solution. The compounds of Formula Ia, for example, 6-fluoro-11β-hydroxy-17α-(α-methallyl)testosterones and 6-fluoro-11β-hydroxy-17α-(α-methallyl)-19-nortestosterones are then recovered from the solution used to hydrolyze the 3-enamine group according to procedures well-known in the art, such as by extraction with water-immiscible solvents, e. g., methylene chloride, ether, benzene, or the like, followed by chromatography.

Other Grignard reagents, for example, allylmagnesium bromide (or chloride), 2-pentenylmagnesium bromide (or chloride), 2-hexenylmagnesium bromide (or chloride) and 2-isohexenylmagnesium bromide are substituted for the 2-butenylmagnesium bromide disclosed above to prepare other compounds represented by Formula Ia, for example, 6-fluoro-11β-hydroxy-17α-allyltestosterone and 6-fluoro-11β-hydroxy-17α-allyl-19-nortestosterone, 6-fluoro-11β-hydroxy-17α-(α-ethallyl)testosterone and 6-fluoro-11β-hydroxy-17α-(α-ethallyl)-19-nortestosterone, 6-fluoro-11β-hydroxy-17α-(α-propallyl)testosterone and 6-fluoro-11β-hydroxy-17α-(α-propallyl)-19-nortestosterone, and 6-fluoro-11β-hydroxy-17α-(α-isopropallyl)testosterone and 6-fluoro-11β-hydroxy-17α-(α-isopropallyl)-19-nortestosterone, respectively.

Butenylmagnesium bromide and other alkyl substituted allylmagnesium halides are known to exist as equilibrium mixtures. Thus, butenylmagnesium bromide exists as a mixture of crotylmagnesium bromide (2-butenylmagnesium bromide) and α-methallylmagnesium bromide. Accordingly, the Grignard reagents named above are to be understood as consisting of the equilibrium mixtures.

The 17-acylates represented by Formula Ib, for example, the 17-acylates of 6-fluoro-11β-hydroxy-17α-(α-methallyl)testosterone and 6-fluoro-11β-hydroxy-17α(α-methallyl)-19-nortestosterone are obtained by allowing the compounds of Formula Ia to react with the anhydride of an organic carboxylic acid, preferably a hydrocarbon carboxylic acid, containing from one to twelve carbon atoms, inclusive, for example, a saturated straight-chain aliphatic acid, e. g., acetic, propionic, butyric, valeric, hexanoic, lauric, a saturated branched-chain aliphatic acid, e. g., trimethylacetic, isobutyric, isovaleric, a cycloaliphatic saturated acid, e. g., cyclohexanecarboxylic, an alkaryl acid, e. g., benzoic, phenylacetic, 2-phenylpropionic, o-, m-, and p-toluic, a saturated dibasic acid (which can be converted into water-soluble, e. g., sodium, salts), e. g., succinic, adipic, a monobasic unsaturated acid, e. g., acrylic, crotonic, undecylenic, propiolic, cinnamic, dibasic unsaturated acids (which can be converted into water-soluble, e. g., sodium, salts), e. g., maleic and citraconic.

Another aspect of the present invention comprises treating the compounds of Formula Ia, for example, 6-fluoro-11β,17β-dihydroxy-17α-(α-methallyl)-4-androsten-3-one and 6-fluoro-11β,17β-dihydroxy-17α-(α-methallyl)-19-nor-4-androsten-3-one with an oxidizing agent, for example, chromic acid, potassium dichromate or sodium dichromate, to obtain the compounds of Formula Ic, for example, 6-fluoro-17β-hydroxy-17α-(α-methallyl)-4-androstene-3,11-dione and 6-fluoro-17β-hydroxy-17α-(α-methallyl)-19-nor-4-androstene-3,11-dione, respectively. The oxidation can be carried out by a variety of methods, such as, for example, by oxidizing the compounds of Formula Ia in acetic acid solution with chromic anhydride or sodium dichromate, or by oxidizing with chromic anhydride in the presence of pyridine. At the conclusion of the desired oxidation reaction, the excess chromic acid is generally destroyed by the addition of methyl alcohol, ethyl alcohol, and the like. Thereafter, the resulting 11-keto compounds of Formula Ic are recovered by conventional means, such as by crystallization, extraction with water-immiscible solvents, e. g., methylene chloride, ether, benzene, toluene, or the like, or by chromatography.

The 17-acylates represented by Formula Id, for example, the 17-acylates of 6-fluoro-11-keto-17α-(α-methallyl)testosterone and 6-fluoro-11-keto-17α-(α-methallyl)-19-nortestosterone are obtained by allowing the compounds of Formula Ic to react with the anhydride of an organic carboxylic acid, preferably a hydrocarbon carboxylic acid, containing from one to twelve carbon atoms, inclusive, for example, a saturated straight-chain aliphatic acid, e. g., acetic, propionic, butyric, valeric, hexanoic, lauric, a saturated branched-chain aliphatic acid, e. g., trimethylacetic, isobutyric, isovaleric, a cycloaliphatic saturated acid, e. g., cyclohexanecarboxylic, an alkaryl acid, e. g., benzoic, phenylacetic, 2-phenylpropionic, o-, m-, and p-toluic, a saturated dibasic acid (which can be converted into water-soluble, e. g., sodium, salts), e. g., succinic, adipic, a monobasic unsaturated acid, e. g., acrylic, crotonic, undecylenic, propiolic, cinnamic, dibasic unsaturated acids (which can be converted into water-soluble, e. g., sodium, salts), e. g., maleic and citraconic.

The starting materials, the compounds of Formula II are prepared according to the procedures disclosed in Preparations 1 and 2 below.

The following preparations and examples are illustrative of the process and products of the present invention, but are not to be construed as limiting.

PREPARATION 1

A. 6β-fluoro-5α,11β-dihydroxyandrostane-3,17-dione

Three grams of 5α,6α-epoxy-11β-hydroxyandrostane-3,17-dione 3,17-bis-(ethylene ketal), prepared according to the procedure disclosed in copending application Serial No. 661,626, filed May 27, 1957, in 25 milliliters of methylene chloride contained in a polyethylene bottle is treated with nine milliliters of 48 percent hydrofluoric acid. The reaction mixture thus obtained is stirred at room temperature for several hours and then cautiously poured into a mixture of 45 milliliters of methylene chloride and fifty milliliters of ice cold 1.5 molar aqueous sodium carbonate solution and stirred with caution. The mixture is exhaustively extracted with methylene chloride and the methylene chloride solution is washed with water and dried over sodium sulfate. Evaporation of the methylene chloride gives a residue containing 6β-fluoro-5α,11β-dihydroxyandrostane-3,17-dione.

B. 6α-fluoro-11β-hydroxy-4-androstene-3,17-dione

The residue containing 6β-fluoro-5α,11β-dihydroxyandrostane-3,17-dione produced in Preparation 1A, is mixed in 200 milliliters of chloroform and seven milliliters of ethyl alcohol and treated with anhydrous hydrogen chloride gas, whilst maintaining the temperature at approximately from minus five to minus ten degrees centigrade. The solution thus obtained is washed with successive portions of water, aqueous sodium bicarbonate solution and water, dried over sodium sulfate, concentrated and chromatographed over 75 grams of activated alumina. The chromatographic column is eluted with Skellysolve B hexanes plus increasing proportions of acetone from two to fifty percent and collected in fifty milliliter fractions. Fractions 8 through 19 are combined and the solvent removed by evaporation leaving a residue. The residue is recrystallized from methylene chloride-hexane to give 6α-fluoro-11β-hydroxy-4-androstene-3,17-dione, a crystalline solid.

PREPARATION 2

A. 19-nor-5-androstene-3,11,17-trione 3,17-bis-(ethylene ketal)

A mixture of five grams of 19-nor-4-androstene-3,11,17-trione (U. S. Patent 2,757,186), 250 milliliters of benzene, twenty milliliters of ethylene glycol and 150 milligrams of p-toluenesulfonic acid is vigorously stirred and heated at reflux under a water trap until the reaction is substantially complete. The reaction mixture is cooled, washed with five percent aqueous sodium carbonate solution and water and dried over sodium sulfate. Evaporation of the solvent gives a crude residue of 19-nor-5-androstene-3,11,17-trione 3,17-bis-(ethylene ketal).

B. 11β-hydroxy-19-nor-5-androstene-3,17-dione 3,17-bis-(ethylene ketal)

The total crude residue obtained in Preparation 2A, is dissolved in fifty milliliters of tetrahydrofuran and added with stirring over approximately a five minute period, under nitrogen, to a mixture of two grams of lithium aluminum hydride and 100 milliliters of anhydrous ether. The mixture is stirred at room temperature for 15 minutes and, whilst ice cooling, carefully treated with twenty milliliters of water. The mixture is then diluted with 200 milliliters of ether, stirred and filtered to remove inorganic solids. The filtrate is washed with three fifty milliliter portions of water, dried over sodium sulfate, and the mixture taken to dryness. The residue is recrystallized from ether to give 11β-hydroxy-19-nor-5-androstene-3,17-dione 3,17-bis-(ethylene ketal), a crystalline solid.

C. 5α,6α-epoxy-11β-hydroxy-19-norandrostane-3,17-dione 3,17-bis-(ethylene ketal)

A mixture of two grams of 11β-hydroxy-19-nor-5-androstene-3,17-dione 3,17-bis-(ethylene ketal), forty milliliters of chloroform and 0.4 gram of sodium acetate is cooled in an ice-water bath and treated with four milliliters of forty percent peracetic acid. The cooled mixture is stirred vigorously for about two hours. The cold bath is then removed and the mixture is stirred with forty milliliters of saturated aqueous sodium bicarbonate solution for approximately one hour and upon being allowed to stand layer separation occurs. The chloroform layer is separated, washed twice with water, dried over sodium sulfate and the solvent removed by distillation. The residue is recrystallized from ether to give 5α,6α-epoxy-11β-hydroxy-19-norandrostane-3,17-dione 3,17-bis-(ethylene ketal), a crystalline solid.

D. 6β-fluoro-5α,11β-dihydroxy-19-norandrostane-3,17-dione

A mixture of 1.7 grams of 5α,6α-epoxy-11β-hydroxy-19-norandrostane-3,17-dione 3,17-bis-(ethylene ketal) and sixteen milliliters of methylene chloride in a polyethylene bottle is treated with six milliliters of 48 percent hydrogen fluoride and stirred vigorously at room temperature for several hours. The reaction mixture is carefully treated with a solution of ten grams of sodium bicarbonate in 125 milliliters of water and extracted with methylene chloride. The extract is washed with water, dried over sodium sulfate, and the solvent removed by distillation. The residue which contains 6β-fluoro-5α,11β-dihydroxy-19-norandrostane 3,17-dione is dissolved in methylene chloride and chromatographed over fifty grams of Florisil (synthetic magnesium silicate), followed by elution of the column using forty milliliter fractions of Skellysolve B hexanes plus increasing proportions of acetone from one to fifty percent. The desired 6β-fluoro-5α,11β-dihydroxy-19-norandrostane-3,17-dione is eluted first and the solvent is removed by evaporation.

E. 6α-fluoro-11β-hydroxy-19-nor-4-androstene-3,17-dione

One gram of 6β-fluoro-5α,11β-dihydroxy-19-norandrostane-3,17-dione, eighty milliliters of chloroform and one milliliter of ethanol is cooled to approximately minus ten degrees centigrade and dry hydrogen chloride is passed through the mixture for several hours while allowing the temperature of the solution to warm to approximately zero degrees centigrade. The thus-obtained solution is diluted with 100 milliliters of chloroform, washed with successive portions of water, aqueous sodium bicarbonate solution, and water and dried over sodium sulfate. The solvent is removed by distillation and the residue crystallized from acetone-Skellysolve B hexanes to give 6α-fluoro-11β-hydroxy-19-nor-4-androstene-3,17-dione, a crystalline solid.

EXAMPLE 1

A. 6-fluoro-11β-hydroxy-3-(N-pyrrolidinyl)-3,5-androstadien-17-one

A mixture of 2.5 grams of 6α-fluoro-11β-hydroxy-4-androstene-3,17-dione in twenty milliliters of methanol is heated to near the boiling point, cooled slightly and treated with 1.3 milliliters of pyrrolidine. The flask is scratched with a glass rod to induce crystallization. The reaction mixture is allowed to cool to room temperature and is then refrigerated at approximately zero degrees centigrade for one hour. The precipitate of 6-fluoro- 11β-hydroxy-3-(N-pyrrolidinyl) - 3,5 - androstadien-17-one thus obtained is collected by filtration, washed with methanol and dried.

In the same manner as shown above, treating 6β-fluoro-11β-hydroxy-4-androstene-3,17-dione with pyrrolidine is productive of 6-fluoro-11β-hydroxy-3-(N-pyrrolidinyl)-3,5-androstadien-17-one.

B. *6-fluoro-11β,17β-dihydroxy-17α-(α-methallyl)-4-androsten-3-one*

A solution of 0.100 mole of 2-butenylmagnesium bromide in thirty milliliters of diethyl ether is prepared according to the method of Young and Roberts, J. Am. Chem. Soc. 68, 1474 (1946), and is stirred under a nitrogen atmosphere while a solution of 3.73 grams of 6-fluoro-11β-hydroxy - 3 - (N-pyrrolidinyl)-3,5-androstadien-17-one in fifty milliliters of tetrahydrofuran is added over a period of ten minutes. The mixture is distilled until the vapor temperature above the reaction mixture reaches 55 degrees centigrade and then heated at reflux for approximately four hours. The mixture is poured carefully with stirring into iced ammonium chloride solution and the resulting mixture is extracted with ether. The ether extract is washed with water, dried over anhydrous sodium sulfate, and the solvent removed at room temperature or below under diminished pressure leaving a residue. The thus obtained residue is heated at reflux for several hours in a buffered solution of six grams of sodium acetate, six milliliters of water, four milliliters of glacial acetic acid, and forty milliliters of methanol. This mixture is then diluted with water and extracted with ether. The ether extract is washed with water, dilute aqueous sodium carbonate, and water, then is dried over anhydrous sodium sulfate and evaporated to dryness, giving a crude product which is dissolved in methylene chloride and chromatographed over 100 grams of Florisil (synthetic magnesium silicate). The chromatogram column is eluted with Skellysolve B hexanes containing increasing proportions of acetone from one to fifty percent by volume. The eluted fractions are examined by infrared absorption analysis and those fractions which show no C-17 carbonyl absorption are combined and crystallized from acetone-hexane mixture to give 6α-fluoro-11β,17β-dihydroxy-17α-(α-methallyl)-4-androsten-3-one [6α - fluoro-11β-hydroxy-17α-(α-methallyl) testosterone]. 6β-fluoro-11β,17β-dihydroxy-17α-(α-methallyl)-4-androsten-3-one is present in the crystallization mother liquors, and can be isolated by additional chromatography followed by crystallization from acetone-hexane mixture.

In the manner shown in Example 1B, treating 6-fluoro-11β-hydroxy - 3 - (N-pyrrolidinyl)-3,5-androstadien-17-one with allylmagnesium bromide and hydrolyzing the product in a buffered mixture is productive of 6-fluoro-11β-hydroxy-17α-allyltestosterone. Similarly, 6-fluoro-11β-hydroxy-17α-(α-ethallyl)testosterone, 6-fluoro-11β-hydroxy-17α-(α-propallyl)testosterone, and 6-fluoro-11β-hydroxy-17α-(α-isopropallyl)testosterone, are prepared by allowing 6-fluoro-11β-hydroxy-3-(N-pyrrolidinyl)-3,5-androstadien-17-one to react with 2-pentenylmagnesium bromide, 2-hexenylmagnesium bromide or 2-isohexenylmagnesium bromide, respectively, and hydrolyzing the enamines as shown in Example 1B. Allylmagnesium bromide is obtained following the procedure of Young and Roberts, J. Am. Chem. Soc. 68, 1474 (1946) for the preparation of 2-butenylmagnesium bromide but substituting allyl bromide for 2-butenyl bromide. Similarly, 2-pentenylmagnesium bromide and 2-hexenylmagnesium bromide are prepared from 1-bromo-2-pentene and 1-bromo-2-hexene [Young, Richards and Azorlosa, J. Am. Chem. Soc. 61, 3070 (1939)], and 2-isohexenylmagnesium bromide is prepared from 1-bromo-4-methyl-2-pentene (isopropylallyl bromide) (Bouis, Annales de Chimie, [10] 9, 412, 421).

C. *6-fluoro-11β,17β-dihydroxy-17α-(α-methallyl)-4-androsten-3-one 17-propionate*

A solution containing one gram of 6α-fluoro-11β,17β-dihydroxy-17α-(α-methallyl)-4-androsten-3-one in nine milliliters of propionic anhydride is heated at a temperature of approximately 100 to 150 degrees centigrade until the reaction is substantially complete. The unreacted propionic anhydride is then removed by distilling the reaction mixture under reduced pressure and the residue is recrystallized several times from aqueous methanol to give 6α-fluoro-11β,17β-dihydroxy-17α-(α-methallyl)-4-androsten-3-one 17-propionate. Treating 6β-fluoro-11β,17β-dihydroxy-17α-(α-methallyl) - 4 - androsten-3-one with propionic anhydride as above is productive of 6β-fluoro-11β,17β-dihydroxy-17α-(α-methallyl)-4-androsten-3-one 17-propionate.

In the same manner shown above 6 - fluoro - 11β,17β-dihydroxy - 17α - (α - methallyl) - 4 - androsten - 3 - one 17 - cyclopentylpropionate, 6 - fluoro - 11β,17β - dihydroxy - 17α - (α - methyllyl) - 4 - androsten - 3 - one 17 - acetate, 6 - fluoro - 11β,17β - dihydroxy - 17α - (α-methallyl) - 4 - androsten - 3 - one 17 - butyrate, 6-fluoro - 11β,17β - dihydroxy - 17α - (α - methallyl) - 4-androsten - 3 - one 17 - valerate, 6 - fluoro - 11β,17β - dihydroxy - 17α - (α - methallyl) - 4 - androsten - 3 - one 17 - hexanoate, 6 - fluoro - 11β,17β - dihydroxy - 17α-(α - methallyl) - 4 - androsten - 3 - one 17 - laurate, 6-fluoro - 11β,17β - dihydroxy - 17α - (α - methallyl) - 4-androsten - 3 - one 17 - trimethylacetate, 6 - fluoro-11β,17β - dihydroxy - 17α - (α - methallyl) - 4 - androsten - 3 - one 17 - isobutyrate, 6 - fluoro - 11β,17β - dihydroxy - 17α - (α - methallyl) - 4 - androsten - 3 - one 17 - isovalerate, 6 - fluoro - 11β,17β - dihydroxy - 17α-(α - methallyl) - 4 - androsten - 3 - one 17 - cyclohexanecarboxylate, 6 - fluoro - 11β,17β - dihydroxy - 17α - (α-methallyl) - 4 - androsten - 3 - one 17 - benzoate, 6-fluoro - 11β,17β - dihydroxy - 17α - (α - methallyl) - 4-androsten - 3 - one 17 - phenylacetate, 6 - fluoro - 11β, 17β - dihydroxy - 17α - (α - methallyl) - 4 - androsten-3 - one 17 - (β - phenylpropionate), 6 - fluoro - 11β,17β-dihydroxy - 17α - (α - methallyl) - 4 - androsten - 3 - one 17 - (o-, m-, p - toluate), 6 - fluoro - 11β,17β - dihydroxy-17α - (α - methallyl) - 4 - androsten - 3 - one 17 - hemisuccinate, 6 - fluoro - 11β,17β - dihydroxy - 17α - (α-methallyl) - 4 - androsten - 3 - one 17 - hemiadipate, 6-fluoro - 11β,17β - dihydroxy - 17α - (α - methallyl) - 4-androsten - 3 - one 17 - acrylate, 6 - fluoro - 11β,17β-dihydroxy - 17α - (α - methallyl) - 4 - androsten - 3 - one 17 - crotonate, 6 - fluoro - 11β,17β - dihydroxy - 17α-(α - methallyl) - 4 - androsten - 3 - one 17 - undecylenate, 6 - fluoro - 11β,17β - dihydroxy - 17α - (α - methallyl)-4 - androsten - 3 - one 17 - propiolate, 6 - fluoro - 11β, 17β - dihydroxy - 17α - (α - methallyl) - 4 - androsten-3 - one 17 - cinnamate, 6 - fluoro - 11β,17β - dihydroxy-17α - (α - methallyl) - 4 - androsten - 3 - one 17 - maleate, and 6 - fluoro - 11β,17β - dihydroxy - 17α - (α - methallyl) - 4 androsten - 3 - one 17 - citraconate are prepared by dissolving 6 - fluoro - 11β,17β - dihydroxy - 17α - (α-methallyl) - 4 - androsten - 3 - one in the appropriate acid anhydride and heating, for example, at between 100 and 150 degrees centigrade. The crude ester is isolated in accordance with the procedure above and recrystallized to give the 6 - fluoro - 11β,17β - dihydroxy - 17α - (α-methallyl) - 4 - androsten - 3 - one 17 - acylate. If the corresponding acid anhydride is solid, an inert solvent such as toluene, xylene, or dioxane can be added to effect solution and to provide a liquid esterification reaction medium.

The 17 - propionates of 6 - fluoro - 11β,17β - dihydroxy - 17α - allyl - 4 - androsten - 3 - one, 6 - fluoro-11β,17β - dihydroxy - 17α - (α - ethallyl) - 4 - androsten-3 - one, 6 - fluoro - 11β,17β - dihydroxy - 17α - (α-propallyl) - 4 - androsten - 3 - one, and 6 fluoro - 11β, 17β - dihydroxy - 17α - (α - isopropallyl) - 4 - androsten- 3 - one are obtained in the same manner as in Example 1C by treating the corresponding steroid with propionic anhydride. Other 17 - acylates of 6 - fluoro - 11β,17β-dihydroxy - 17α - allyl - 4 - androsten - 3 - one, 6 - fluoro-11β,17β - dihydroxy - 17α - (α - ethallyl) - 4 - androsten-3 - one, 6 - fluoro - 11β,17β - dihydroxy - 17α - (α-propallyl) - 4 - androsten - 3 - one and 6 - fluoro - 11β, 17β - dihydroxy - 17α - (α - isopropallyl) - 4 - androsten-3 - one are produced in the same mmaner as in Example 1C by dissolving 6 - fluoro - 11β,17β - dihydroxy - 17α-allyl - 4 - androsten - 3 - one, 6 - fluoro - 11β,17β - dihydroxy - 17α - (α - ethallyl) - 4 - androsten - 3 - one, 6-fluoro - 11β,17β - dihydroxy - 17α - (α - propallyl) - 4-androsten - 3 - one or 6 - fluoro - 11β,17β - dihydroxy-17α - (α - isopropallyl) - 4 - androsten - 3 - one in the appropriate acid anhydride and heating, for example, at between 100 and 150 degrees centigrade. The crude ester is isolated and crystallized in accordance with the procedure of Example 1C.

EXAMPLE 2

A. *6-fluoro-11β-hydroxy-3-(N-pyrrolidinyl)-19-nor-3,5-androstadien-17-one*

In the same manner shown in Example 1A, treating 6α-fluoro - 11β - hydroxy - 19 - nor - 4 - androstene - 3,17-dione or 6β - fluoro - 11β - hydroxy - 19 - nor - 4 - androstene - 3,17 - dione with pyrrolidine is productive of 6 - fluoro - 11β - hydroxy - 3 - (N - pyrrolidinyl) - 19-nor - 3,5 - androstadien - 17 - one.

B. *6-fluoro-11β,17β-dihydroxy-17α-(α-methallyl)-19-nor-4-androsten-3-one*

In the same manner shown in Example 1B, treating 6 fluoro - 11β - hydroxy - 3 - (N - pyrrolidinyl) - 19-nor - 3,5 - androstadien - 17 - one with 2 - butenylmagnesium bromide, hydrolyzing the Grignard reaction mixture with aqueous ammonium chloride, and hydrolyzing the resulting enamine with a mixture of sodium acetate, acetic acid, water and methanol is productive of 6α-fluoro - 11β,17β - dihydroxy - 17α - (α - methallyl) - 19-nor - 4 - androsten - 3 - one and 6β - fluoro - 11β,17β-dihydroxy - 17α - (α - methallyl) - 19 - nor - 4 - androsten - 3 - one. Substituting allylmagnesium bromide, 2-pentenylmagnesium bromide, 2 - hexenylmagnesium bromide, or 2 - isohexeneylmagnesium bromide for 2 - butenylmagnesium bromide in the above process is productive of the corresponding 6 - fluoro - 11β,17β - dihydroxy-17α - allyl - 19 - nor - 4 - androsten - 3 - one, 6 - fluoro-11β,17β - dihydroxy - 17α - (α - ethallyl) - 19 - nor - 4-androsten - 3 - one, 6 - fluoro - 11β,17β - dihydroxy - 17α-(α - propallyl) - 19 - nor - 4 - androsten - 3 - one and 6 - fluoro - 11β,17β - dihydroxy - 17α - (α - isopropallyl)-19 - nor - 4 - androsten - 3 one.

C. *6-fluoro-11β,17β-dihydroxy-17α-(α-methallyl)-19-nor-4-androsten-3-one 17-propionate*

In the same manner shown in Example 1C, treating 6 - fluoro - 11β,17β - dihydroxy - 17α - (α - methallyl)-19 - nor - 4 - androsten - 3 - one with propionic anhydride is productive of 6 - fluoro - 11β,17β - dihydroxy - 17α-(α - methallyl) - 19 - nor - 4 - androsten - 3 - one 17-propionate.

In a like manner other 17-acylates are prepared by dissolving 6-fluoro-11β,17β-dihydroxy-17α-(α-methallyl)-19-nor-4-androsten-3-one in the appropriate acid anhydride, heating, for example, at between 100 and 150 degrees centigrade and isolating the product as shown in Example 1C.

The 17-propionates of 6-fluoro-11β,17β-dihydroxy-17α-allyl-19-nor-4-androsten-3-one, 6-fluoro-11β,17β-dihydroxy-17α-(α-ethallyl)-19-nor-4-androsten-3-one, 6-fluoro-11β,17β-dihydroxy - 17α - (α-propallyl)-19-nor-4-androsten-3-one, and 6-fluoro-11β,17β-dihydroxy-17α-(α-isopropallyl)-19-nor-4-androsten-3-one are obtained in the same manner as in Example 1C by treating the corresponding steroid with propionic anhydride. Other 17-acylates of 6-fluoro-11β,17β-dihydroxy-17α-allyl-19-nor-4-androsten-3-one, 6-fluoro-11β,17β-dihydroxy-17α-(α-ethallyl)-19-nor-4-androsten-3-one, 6-fluoro-11β,17β-dihydroxy-17α-(α-propallyl)-19-nor-4-androsten-3-one and 6-fluoro - 11β,17β - dihydroxy - 17α - (α-isopropallyl)-19-nor-4-androsten-3-one are produced in the same manner as in Example 1C by dissolving 6-fluoro-11β,17β-dihydroxy - 17α - allyl-19-nor-4-androsten-3-one, 6-fluoro-11β,17β-dihydroxy-17α-(α-ethallyl)-19 - nor-4-androsten-3-one, 6-fluoro-11β,17β-dihydroxy-17α-(α-propallyl)-19-nor-4-androsten-3-one and 6-fluoro-11β,17β-dihydroxy-17α-(α-isopropallyl)-19-nor-4-androsten-3-one in the appropriate acid anhydride and heating, for example, at between 100 and 150 degrees centigrade. The crude ester is isolated and crystallized in accordance with the procedure in Example 1C.

EXAMPLE 3

A. *6-fluoro-17β-hydroxy-17α-(α-methallyl)-4-androstene-3,11-dione*

To a solution of 0.50 gram of 6α-fluoro-11β,17β-dihydroxy-17α-(α-methallyl)-4-androsten-3-one in twenty milliliters of acetic acid there is added a solution of 0.25 gram of chromic anhydride, one milliliter of water, and twenty milliliters of acetic acid. The reaction mixture after being allowed to stand at approximately 25 degrees centigrade for several hours is diluted with five milliliters of methanol and concentrated almost to dryness in vacuo and the residue thus obtained is then treated with twenty milliliters of water. The product is recovered by filtration, washed with water, dried and recrystallized from acetone-hexane to give 6α-fluoro-17β-hydroxy-17α-(α-methallyl)-4-androstene-3,11-dione, a crystalline solid. In like manner 6β-fluoro-17β-hydroxy-17α-(α-methallyl)-4-androstene-3,11-dione is obtained by the oxidation of 6β-fluoro-11β,17β-dihydroxy-17α-(α-methallyl)-4-androstene-3-one.

Similarly, 6-fluoro-17β-hydroxy-17α-allyl-4-androstene-3,11-dione, 6-fluoro-17β-hydroxy-17α-(α-ethallyl)-4-androstene-3,11-dione, 6-fluoro-17β-hydroxy-17α-(α-propallyl)-4-androstene-3,11-dione and 6-fluoro-17β-hydroxy-17α-(α-isopropallyl)-4-androstene-3,11-dione are obtained in the same manner as in Example 3A by the oxidation of the corresponding starting steroid.

B. *6-fluoro-17β-hydroxy-17α-(α-methallyl)-4-androstene-3,11-dione 17-propionate*

A solution containing one gram of 6α-fluoro-17β-hydroxy-17α-(α-methallyl)-4-androstene-3,11-dione in nine milliliters of propionic anhydride is heated at a temperature of approximately 100 to 150 degrees centigrade until the reaction is substantially complete. The unreacted propionic anhydride is then removed by distilling the reaction mixture under reduced pressure and the residue is crystallized from aqueous methanol to give 6α-fluoro-17β-hydroxy - 17α - (α-methallyl)-4-androstene-3,11-dione 17-propionate. Treating 6β-fluoro-17β-hydroxy-17α-(α-methallyl) - 4 - androstene-3,11-dione with propionic anhydride as above is productive of 6β-fluoro-17β-hydroxy-17α-(α - methallyl)-4-androstene-3,11-dione 17-propionate.

In the same manner shown above other 17-acylates of 6-fluoro - 17β - hydroxy-17α-(α-methallyl)-4-androstene-3,11-dione, for example, 6-fluoro-17β-hydroxy-17α-(α-methallyl)-4-androstene-3,11-dione 17-cyclopentylpropionate, 6-fluoro-17β-hydroxy-17α-(α-methallyl)-4-androstene-3,11-dione 17-acetate, 6-fluoro-17β-hydroxy-17α-(α-methallyl)-4-androstene-3,11-dione 17-butyrate, 6-fluoro-17β-hydroxy-17α-(α - methallyl)-4-androstene-3,11-dione 17-valerate, 6-fluoro-17β-hydroxy-17α-(α-methallyl)-4-androstene-3,11-dione 17-hexanoate, 6-fluoro-17β-hydroxy-17α-(α-methallyl)-4-androstene-3,11-dione 17-laurate, 6-fluoro-17β-hydroxy-17α-(α-methallyl)-4-androstene-3,11-dione 17-trimethylacetate, 6-fluoro-17β-hydroxy-17α-(α-methallyl)-4-androstene-3,11-dione 17-isobutyrate, 6-fluoro-17β-hydroxy-17α-(α-methallyl)-4-androstene-3,11-dione 17-isovalerate, 6-fluoro-17β-hydroxy-17α-(α-methallyl)-4-androstene-3,11-dione 17-cyclohexane-carboxylate, 6-fluoro-17β-hydroxy-17α-(α-methallyl)-4-androstene-3,11-dione 17-benzoate, 6-fluoro-17β-hydroxy-17α-(α-methallyl)-4-androstene-3,11-dione 17-phenylacetate, 6-fluoro-17β-hydroxy-17α-(α-methallyl)-4-androstene-3,11-dione 17-(β-phenylpropionate), 6-fluoro-17β-hydroxy-17α-(α-methallyl)-4-androstene-3,11-dione 17-o-, m-, p-toluate, 6-fluoro-17β-hydroxy-17α-(α-methallyl)-4-androstene-3,11-dione 17-hemisuccinate, 6-fluoro-17β-hydroxy-17α-(α-methallyl)-4-androstene-3,11-dione 17-hemiadipate, 6-fluoro-17β-hydroxy-17α-(α-methallyl)-4-androstene-3,11-dione 17-acrylate, 6-fluoro-17β-hydroxy-17α-(α-methallyl)-4-androstene-3,11-dione 17-crotonate, 6-fluoro-17β-hydroxy-17α-(α-methallyl)-4-androstene-3,11-dione 17-undecylenate, 6-fluoro-17β-hydroxy-17α-(α-methallyl)-4-androstene-3,11-dione 17-propiolate, 6-fluoro-17β-hydroxy-17α-(α-methallyl)-4-androstene-3,11-dione 17-cinnamate, 6-fluoro-17β-hydroxy-17α-(α-methallyl)-4-androstene-3,11-dione 17-maleate, and 6-fluoro-17β-hydroxy-17α-(α-methallyl)-4-androstene-3,11-dione 17-citraconate, are prepared by dissolving 6-fluoro-17β-hydroxy-17α-(α-methallyl)-4-androstene-3,11-dione in the appropriate acid anhydride and heating, for example, at between 100 and 150 degrees centigrade. The crude ester is isolated in accordance with the procedure above and recrystallized to give the 6-fluoro-17β-hydroxy-17α-(α-methallyl)-4-androstene-3,11-dione 17-acylate. If the corresponding acid anhydride is solid, an inert solvent such as toluene, xylene, or dioxane can be added to effect solution and to provide a liquid esterification medium.

The 17-propionates of 6-fluoro-17β-hydroxy-17α-allyl-4-androstene-3,11-dione, 6-fluoro-17β-hydroxy-17α-(α-ethallyl)-4-androstene-3,11-dione, 6-fluoro-17β-hydroxy-17α-(α-propallyl)-4-androstene-3,11-dione and 6-fluoro-17β-hydroxy-17α-(α-isopropallyl)-4-androstene-3,11-dione are obtained in the same manner as in Example 3B by treating the corresponding steroid with propionic anhydride. Other 17-acylates of 6-fluoro-17β-hydroxy-17α-allyl-4-androstene-3,11-dione, 6-fluoro-17β-hydroxy-17α-(α-ethallyl)-4-androstene-3,11-dione, 6-fluoro-17β-hydroxy-17α-(α-propallyl)-4-androstene-3,11-dione, and 6-fluoro-17β-hydroxy-17α-(α-isopropallyl)-4-androstene-3,11-dione, are produced in the same manner as in Example 3B by dissolving 6-fluoro-17β-hydroxy-17α-allyl-4-androstene-3,11-dione, 6-fluoro-17β-hydroxy-17α-(α-ethallyl)-4-androstene-3,11-dione, 6-fluoro-17β-hydroxy-17α-(α-propallyl)-4-androstene-3,11-dione, and 6-fluoro-17β-hydroxy-17α-(α-isopropallyl)-4-androstene-3,11-dione, in the appropriate acid anhydride and heating, for example, at between 100 and 150 degrees centigrade. The crude ester is isolated and crystallized in accordance with procedure of Example 3B.

EXAMPLE 4

A. *6-fluoro-17β-hydroxy-17α-(α-methallyl)-19-nor-4-androstene-3,11-dione*

In the same manner shown in Example 3A, treating 6α-fluoro-11β,17β-dihydroxy-17α-(α-methallyl)19-nor-4-androsten-3-one with chromic anhydride is productive of 6α-fluoro-17β-hydroxy-17α-(α-methallyl)-19-nor-4-androstene-3,11-dione. In like manner 6β-fluoro-17β-hydroxy-17α-(α-methallyl)-19-nor-4-androstene-3,11-dione is obtained from 6β-fluoro-11β,17β-dihydroxy-17α-(α-methallyl)-19-nor-4-androsten-3-one by oxidation with chromic anhydride.

Similarly, 6-fluoro-17β-hydroxy-17α-allyl-19-nor-4-androstene-3,11-dione, 6-fluoro-17β-hydroxy-17α-(α-ethallyl)-19-nor-4-androstene-3,11-dione, 6-fluoro-17β-hydroxy-17α-(α-propallyl)-19-nor-4-androstene-3,11-dione, and 6-fluoro-17β-hydroxy-17α-(α-isopropallyl)-19-nor-4-androstene-3,11-dione, are obtained in the same manner as in Example 3A by oxidation of the corresponding starting steroid.

B. *6-fluoro-17β-hydroxy-17α-(α-methallyl)-19-nor-4-androstene-3,11-dione 17-propionate*

In the same manner shown in Example 3B, treating 6α-fluoro-17β-hydroxy-17α-(α-methallyl)-19-nor-4-androstene-3-11-dione with propionic anhydride is productive of 6α-fluoro-17β-hydroxy-17α-(α-methallyl)-19-nor-4-androstene-3,11-dione 17-propionate. In like manner 6β-fluoro-17β-hydroxy-17α-(α-methallyl)-19-nor-4-androstene-3,11-dione 17-propionate is obtained by esterifying 6β-fluoro-17β-hydroxy-17α-(α-methallyl)-19-nor-4-androstene-3,11-dione with propionic anhydride.

Similarly other 17-acylates are prepared by dissolving 6-fluoro-17β-hydroxy-17α-(α-methallyl)-19-nor-4-androstene-3,11-dione in the appropriate acid anhydride, heating, for example, at between 100 and 150 degrees centigrade and isolating the product as shown in Example 3B.

The 17-propionates of 6-fluoro-17β-hydroxy-17α-allyl-19-nor-4-androstene-3,11-dione, 6-fluoro-17β-hydroxy-17α-(α-ethallyl)-19-nor-4-androstene-3,11-dione, 6-fluoro-17β-hydroxy-17α-(α-propallyl)-19-nor-4-androstene-3,11-dione, and 6-fluoro-17β-hydroxy-17α-(α-isopropallyl)-19-nor-4-androstene-3,11-dione, are obtained in the same manner as in Example 3B by treating the corresponding steroid with propionic anhydride. Other 17-acylates of 6-fluoro-17β-hydroxy-17α-allyl-19-nor-4-androstene-3,11-dione, 6-fluoro-17β-hydroxy-17α-(α-ethallyl)-19-nor-4-androstene-3,11-dione, 6-fluoro-17β-hydroxy-17α-(α-propallyl)-19-nor-4-androstene-3,11-dione, and 6-fluoro-17β-hydroxy-17α-(α-isopropallyl)-19-nor-4-androstene-3,11-dione are produced in the same manner as in Example 3B by dissolving 6-fluoro-17β-hydroxy-17α-allyl-19-nor-4-androstene-3,11-dione, 6-fluoro-17β-hydroxy-17α-(α-ethallyl)-19-nor-4-androsten-3,11-dione, 6-fluoro-17β-hydroxy-17α-(α-propallyl)-19-nor-4-androstene-3,11-dione, and 6-fluoro-17β-hydroxy-17α-(α-isopropallyl)19-nor-4-androstene-3,11-dione in the appropriate acid anhydride and heating, for example, at between 100 and 150 degrees centigrade. The crude ester is isolated in accordance with procedure in Example 3B.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A compound of the formula:

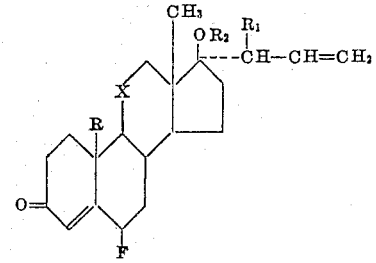

wherein R is selected from the group consisting of hydrogen and methyl, $R_1$ is selected from the group consisting of hydrogen and an alkyl radical containing from one to three carbon atoms, inclusive, $R_2$ is selected from the group consisting of hydrogen and the acyl radical of a hydrocarbon carboxylic acid containing from one to twelve carbon atoms, inclusive, and X is selected from the group consisting of >CHOH and >C=O.

2. 6-fluoro-11β,17β-dihydroxy-17α-(α-methallyl)-4-androsten-3-one.

3. 6α - fluoro - 11β,17β - dihydroxy - 17α - (α - methallyl) - 4 - androsten - 3 - one.

4. 6 - fluoro - 11β,17β - dihydroxy - 17α - (α - methallyl)-4-androsten-3-one 17-acylates in which the acyl radical is that of a hydrocarbon carboxylic acid containing from one to twelve carbon atoms, inclusive.

5. 6α - fluoro - 11β,17β - dihydroxy - 17α - (α - methallyl) - 4 - androsten - 3 - one 17-acylates in which the acyl radical is that of a hydrocarbon carboxylic acid containing from one to twelve carbon atoms, inclusive.

6. 6α - fluoro - 11β,17β - dihydroxy - 17α - (α - methallyl) - 4 - androsten - 3 - one 17 - propionate.

7. 6 - fluoro - 17β - hydroxy - 17α - (α - methallyl)-4-androstene-3,11-dione.

8. 6α - fluoro - 17β - hydroxy - 17α - (α - methallyl)-4-androstene-3,11-dione.

9. 6 - fluoro - 17β - hydroxy - 17α - (α - methallyl)-4-androstene-3,11-dione 17-acylates in which the acyl radical is that of a hydrocarbon carboxylic acid containing from one to twelve carbon atoms, inclusive.

10. 6α - fluoro - 17β - hydroxy - 17α - (α - methallyl)-4-androstene-3,11-dione 17-acylates in which the acyl radical is that of a hydrocarbon carboxylic acid containing from one to twelve carbon atoms, inclusive.

11. 6α - fluoro - 17β - hydroxy - 17α - (α - methallyl)-4-androstene-3,11-dione 17-propionate.

12. A compound of the formula:

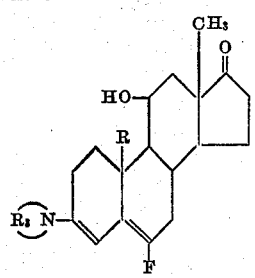

wherein R is selected from the group consisting of methyl and hydrogen and $R_3$ is an alkylene group containing less than nine carbon atoms and having a four to five carbon atom bridge between the valences which, together with the nitrogen atom, forms a ring which contains from five to six members, inclusive.

13. 6 - fluoro - 11β - hydroxy - 3 - (N - pyrrolidinyl)-3,5-androstadien-17-one.

No references cited.

UNITED STATES PATENT OFFICE
Certificate of Correction

Patent No. 2,838,491                                                   June 10, 1958

Milton E. Herr et al.

It is hereby certified that error appears in the printed specification of the above numbered patent requiring correction and that the said Letters Patent should read as corrected below.

Column 2, Formula Ia, lower left-hand portion thereof should appear as shown below instead of as in the patent—

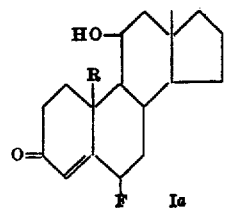

Signed and sealed this 7th day of October 1958.

[SEAL]

Attest:
KARL H. AXLINE,
*Attesting Officer.*

ROBERT C. WATSON,
*Commissioner of Patents.*